(12) United States Patent
Adams et al.

(10) Patent No.: US 7,738,350 B2

(45) Date of Patent: Jun. 15, 2010

(54) PROBE STORAGE WITH DOPED DIAMOND-LIKE CARBON MEDIUM AND CURRENT LIMITER

(75) Inventors: Donald Adams, Pleasanton, CA (US); Yevgeny V. Anoikin, Fremont, CA (US); Byong M. Kim, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 737 days.

(21) Appl. No.: 11/714,379

(22) Filed: Mar. 5, 2007

(65) Prior Publication Data

US 2008/0219133 A1 Sep. 11, 2008

(51) Int. Cl.
*G11B 9/00* (2006.01)

(52) U.S. Cl. ...................... 369/126; 369/288

(58) Field of Classification Search ............ None
See application file for complete search history.

(56) References Cited

U.S. PATENT DOCUMENTS

| 7,301,887 B2 * | 11/2007 | Rust et al. | 369/126 |
| 7,336,524 B2 * | 2/2008 | Rust | 365/151 |
| 7,379,412 B2 * | 5/2008 | Rust et al. | 369/126 |
| 7,414,953 B2 * | 8/2008 | Rust et al. | 369/126 |

* cited by examiner

*Primary Examiner*—Paul Huber
(74) *Attorney, Agent, or Firm*—Blakely, Sokoloff, Taylor & Zafman LLP

(57) ABSTRACT

According to embodiments of the present invention, a probe storage medium includes a conductive layer as an electrode and a metal, metalloid, and/or non-metal doped diamond-like carbon (DLC) layer disposed on the conductive layer. A probe array may be positioned close proximity with the layer of doped DLC. An individual probe in the probe array may have an atomic force microscope tip. The probe storage medium may be written to by applying a current, voltage, and/or power to the tip between a thresholds current, voltage, and/or power value and a limiting current, voltage, and/or power value. The current, voltage, and/or power cause the layer of DLC to change conductance. The probe storage medium may be read by applying a current, voltage, and/or power to the tip below a threshold current, voltage, and/or power value and sensing the conductance.

25 Claims, 8 Drawing Sheets

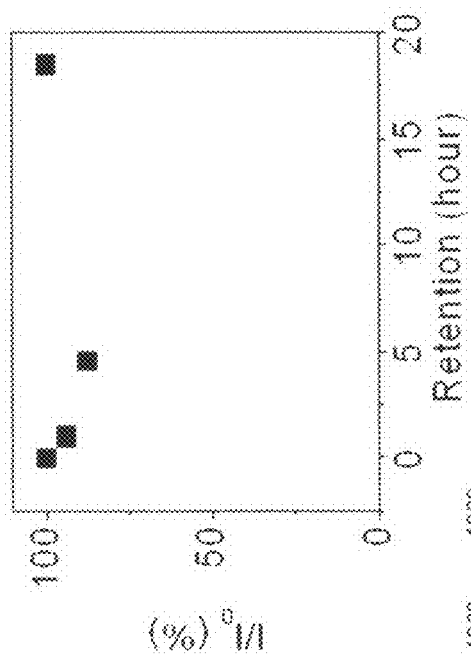
FIG. 15
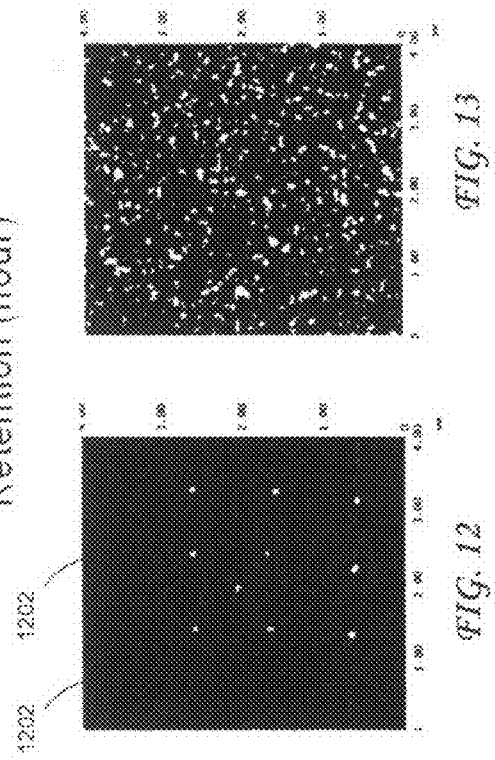
FIG. 13
FIG. 12
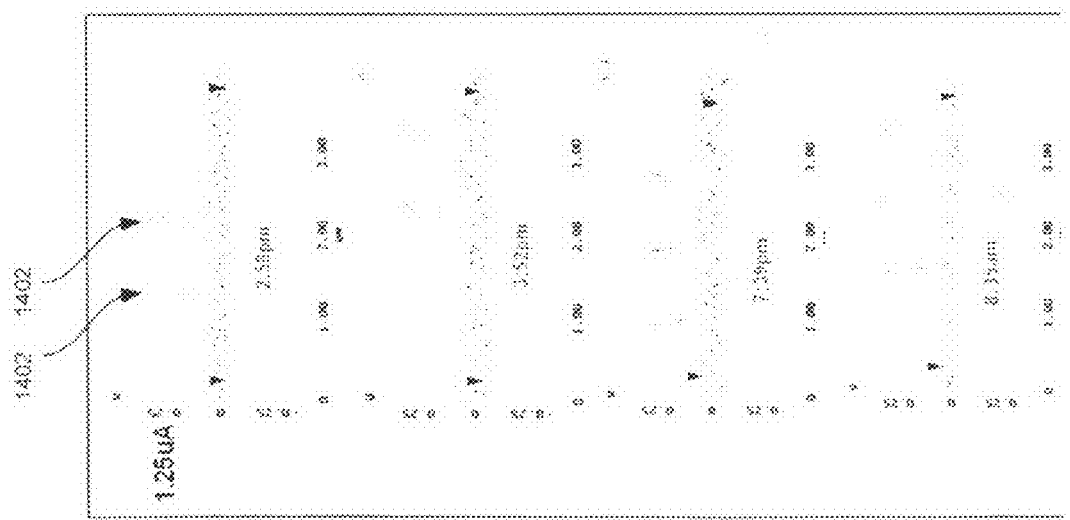
FIG. 14

PROBE STORAGE WITH DOPED DIAMOND-LIKE CARBON MEDIUM AND CURRENT LIMITER

BACKGROUND

1. Field

Embodiments of the present invention relate to data storage media and, in particular, to probe storage media.

2. Discussion of Related Art

In general, conventional memory devices perform well to store data. However, they suffer from some limitations. Manufacturers are thus continually looking for alternatives to conventional memory devices. Probe storage media is one such alternative.

BRIEF DESCRIPTION OF THE DRAWINGS

In the drawings, like reference numbers generally indicate identical, functionally similar, and/or structurally equivalent elements. The drawing in which an element first appears is indicated by the leftmost digit(s) in the reference number, in which:

FIG. 12 is a conductive atomic force microscope (CAFM) image of an array of high contrast bits of ones and zeros written to a diamond-like carbon layer according to an embodiment of the present invention;

FIG. 13 illustrates a substantially simultaneously imaged topography of the CAFM image illustrated in FIG. 12 according to an embodiment of the present invention;

FIG. 14 is a graphical representation illustrating that the bits illustrated in FIG. 12 remained in the layer of diamond-like carbon according to an embodiment of the present invention; and FIG. 15 is a graphical representation illustrating time evolution of relative amplitude of bits written to the layer of diamond-like carbon 106 according to an embodiment of the present invention.

DETAILED DESCRIPTION OF EMBODIMENTS

Figure 1:
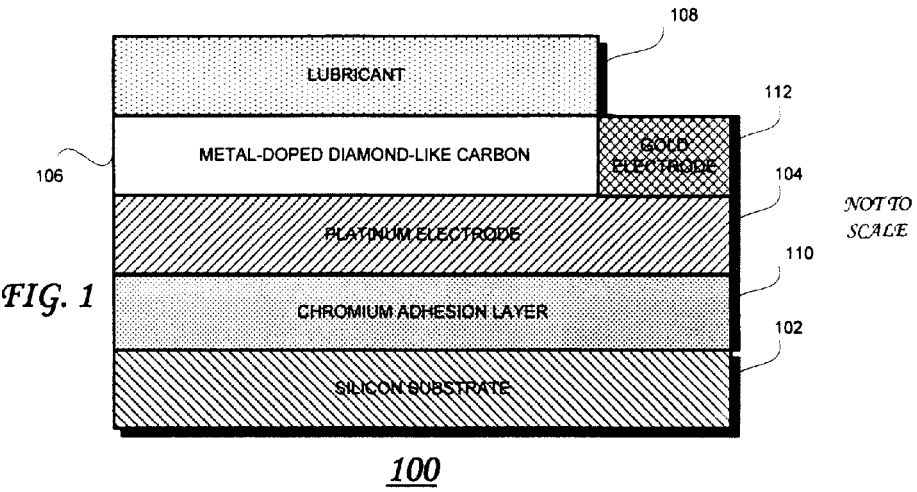
FIG. 1 illustrates a data storage medium according to an embodiment of the present invention.

FIG. 1 illustrates a data storage medium 100 according to an embodiment of the present invention. In the illustrated embodiment, the data storage medium 100 includes an substrate 102, a layer of metal for an electrode 104 disposed on the substrate 102, a layer of diamond-like carbon (DLC) 106 disposed on the electrode 104, and an optional layer of lubricant 108 disposed on the layer of diamond-like carbon 106. An optional adhesion layer 110 is disposed between the substrate 102 and the electrode 104. An optional layer of metal for another electrode 112 is disposed on the layer of diamond-like carbon 106 and the electrode 104.

In the illustrated embodiment, the substrate 102 comprises a layer of silicon. In alternative embodiments, other suitable materials may be used to implement the substrate 102 for the data storage medium 100.

In the illustrated embodiment, the electrode 104 comprises a layer of platinum. For alternative embodiments, gold, molybdenum, titanium, or other suitable conductive material may be used as the electrode 104 for the data storage medium 100.

The layer of diamond-like carbon 106 may be a carbonaceous film. Phase transition of the layer of diamond-like carbon 106 from one conducting state to a higher conducting state, for example, may take place when treated to sufficiently elevated temperatures.

For some embodiments, the layer of diamond-like carbon 106 may be the recording material for the data storage medium 100. The layer of diamond-like carbon 106 may be doped with a metal, such as tungsten, molybdenum, or other suitable metal dopant. Alternative dopants include silicon, boron, or other suitable metalloid. Dopants also may include nitrogen or other suitable non-metal. If the layer of diamond-like carbon 106 is doped with silicon, the result may form silicon carbide. If the layer of diamond-like carbon 106 is doped with nitrogen, the result may form carbide nitride. The dopants may enable easier differentiation between whether a determination that a bit has been read is due to an actual change in electrical conductance, resistivity, and/or resistance caused by the data storage medium 100 being written to or due to a loss of contact of the reading probe with the surface of the data storage medium 100.

The optional lubricant 108 may ease the scanning movement of a probe (not shown) across the data storage medium 100. For some embodiments, the lubricant 108 may be a layer of perfluoropolyether (PFPE), such as Fromblin-Z, for example.

The adhesion layer 110 may serve to promote the adhesion of the electrode 104 to the substrate 102. The adhesion layer 110 also may serve to control inter-diffusion of the atoms between the electrode 104 and the substrate 102. In the illustrated embodiment, the adhesion layer 110 may be chromium, as illustrated in FIG. 1. For other embodiments, the adhesion layer 110 may be titanium or other suitable material.

The optional electrode 112 may be used to apply power, voltage, and/or current to write data bits to and read data bits from the data storage medium 100. The electrode 112 may facilitate making an electrical connection to the electrode 104. Alternatively, power, voltage, and/or current may be applied directly to the electrode 104 to write and read data bits. In the illustrated embodiment, the electrode 112 is gold.

For other embodiments, the electrode 112 may be platinum, molybdenum, titanium, or other suitable conductive material.

Figure 2:
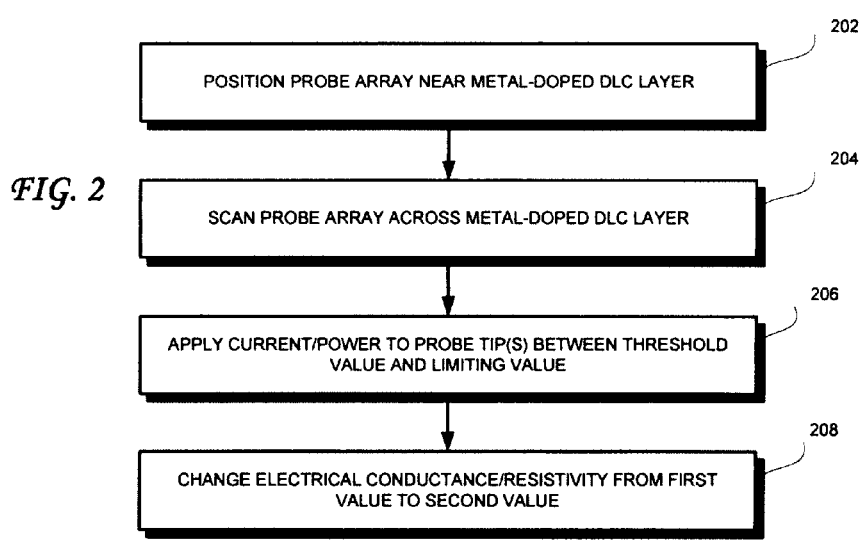
FIG. 2 is a flowchart illustrating a method for operating a data storage medium according to an embodiment of the present invention.

FIG. 2 is a flowchart illustrating a method 200 for electrically writing at least one data bit to the data storage medium 100 according to an embodiment of the present invention. FIG. 2 is described with reference to FIG. 3, which illustrates a logic that may be used to write to the data storage medium 100 according to an embodiment of the present invention, and FIG. 4, which is a graphic representation illustrating the application of power, voltage, and/or current to a probe array to write to the data storage medium 100 according to an embodiment of the present invention.

Figure 3:
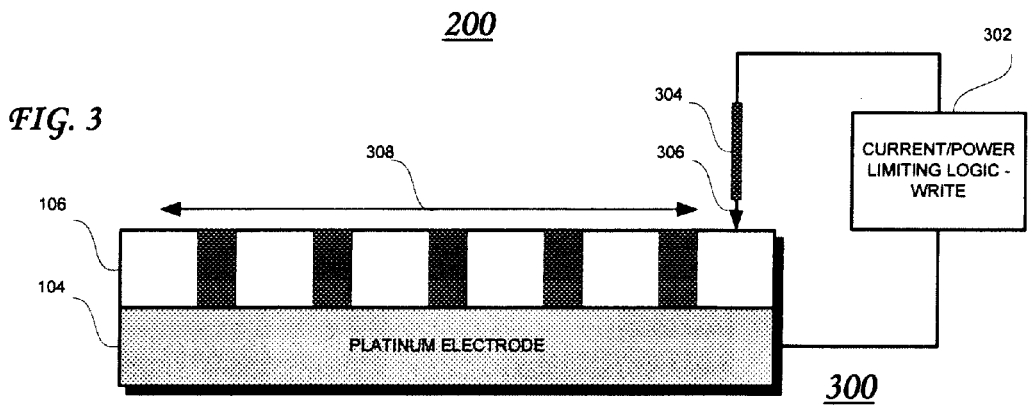
FIG. 3 illustrates writing to a data storage medium according to an embodiment of the present invention.

In the embodiment illustrated in FIG. 3, current, voltage, and/or power limiting logic 302 is coupled to the platinum electrode 104 and to a probe array 304. The probe array 304 may be a scanning probe microscope (SPM), such as a scanning tunneling microscope (STM) or an atomic force microscope (AFM), for example. The probe array 304 may include a tip array 306. The tip of an individual probe may be coated in platinum.

Figures 4, 5:
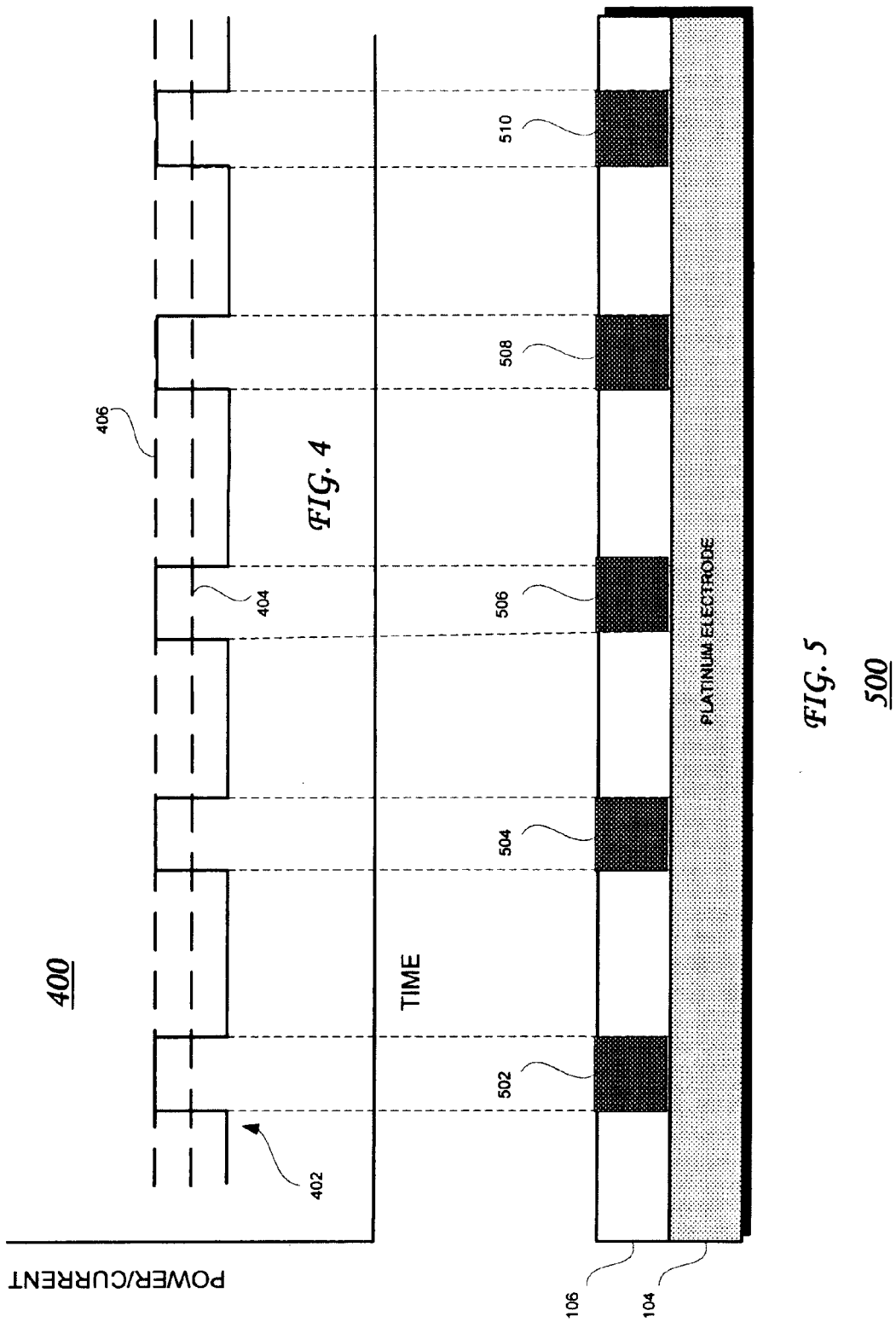
FIG. 4 is a graphic representation illustrating the application of power, voltage, and/or current to a probe to write to a data storage medium according to an embodiment of the present invention.
FIG. 5 illustrates a data storage medium after being written to according to an embodiment of the present invention.

In the embodiment illustrated in FIG. 4, the graphical representation 400 includes a pulse train 402, a threshold current, voltage, and/or power value 404, and a limiting current, voltage, and/or power value 406.

The logic 302 may be any suitable logic that may provide a current, voltage, and/or power to the probe array 304 and/or the tip array 306 that is between the threshold current, voltage, and/or power value 404 and a limiting current, voltage, and/or power value 406. For some embodiments, the logic 302 may be one or more current mirrors, one or more comparators, one or more operational amplifiers, programmable logic, or other suitable logic capable of providing a current, voltage, and/or power to the probe array 304 and/or the tip array 306 that is between the threshold current, voltage, and/or power value 404 and a limiting current, voltage, and/or power value 406.

Referring to FIG. 2, in block 202 of the method 200, the probe array 304 may be positioned in close proximity or in contact with the layer of diamond-like carbon 106.

In block 204, the probe array 304 may be scanned across the surface of the layer of diamond-like carbon 106. For some embodiments, the probe array 304 may be scanned in the direction indicated by the arrow 308.

In block 206, a current, voltage, and/or power is applied to the probe array 304 and/or the tip array 306 from the logic 302. The current, voltage, and/or power level applied is between the threshold current, voltage, and/or power value 404 and a limiting current, voltage, and/or power value 406.

For some embodiments, a positive voltage may be applied to the tip 306 while holding the platinum electrode layer 104 at ground potential. The voltage may be approximately 0.9 volts to 1.0 volts corresponding to a threshold current of approximately 100 microamperes and 200 microamperes. The current above the threshold current value may be 800 microamperes corresponding to a limiting power of 800 microwatts. Thus if writing to the data storage medium 100, the current is applied to the probe array 304 and/or the tip array 306 from the logic 302 may be between a threshold value of threshold current of approximately 100 microamperes and 200 microamperes and a limiting value of 800 microamperes.

In block 208, the electrical conductance, resistance, and/or resistivity of the layer of diamond-like carbon 106 changes as a result of the current between the threshold current, voltage, and/or power value 404 and a limiting current, voltage, and/or power value 406 being injected locally on the layer of diamond-like carbon 106. For some embodiments, the conductance of the layer of diamond-like carbon 106 changes from a low conductance value to a high conductance value if current is injected at a value between the threshold current, voltage, and/or power value 404 and a limiting current, voltage, and/or power value 406. The low conductance state of the layer of diamond-like carbon 106 may be an sp3 cubic orientation in amorphous, polycrystalline, crystalline, and/or a mixture of these phases. The high conductance state of the layer of diamond-like carbon 106 may be an sp2 cubic orientation. The transition from the sp3 cubic orientation to the sp2 orientation may be a result of Joule heating and/or ohmic heating.

For other embodiments, the electrical resistance of the layer of diamond-like carbon 106 changes from a high resistance value to a low resistance value if current is injected at a value between the threshold current, voltage, and/or power value 404 and a limiting current, voltage, and/or power value 406. For example, the electrical resistance of the layer of diamond-like carbon 106 changes from approximately one mega ohm to approximately one kilo ohm if current is injected at a value between the threshold current, voltage, and/or power value 404 and a limiting current, voltage, and/or power value 406.

For other embodiments, the electrical resistivity of the layer of diamond-like carbon 106 changes from a high resistivity value to a low resistance value if current is injected at a value between the threshold current, voltage, and/or power value 404 and a limiting current, voltage, and/or power value 406. The resistivity change may depend on the size of the portion of the layer of diamond-like carbon 106 being injected with the current.

For other embodiments, keeping the injected current at a value between the threshold current, voltage, and/or power value 404 and a limiting current, voltage, and/or power value 406 also may allow data bits to be written to the data storage medium 100 while maintaining the topology of the layer diamond-like carbon 106 substantially smooth.

FIG. 5 illustrates a data storage medium 500 after being written to according to an embodiment of the present invention. Note that the data storage medium 500 includes areas of low conductance 502, 504, 506, 508, and 510 that correspond to the portions of the pulse train 402 in which the injected current was at a value between the threshold current, voltage, and/or power value 404 and a limiting current, voltage, and/or power value 406.

Figure 6:
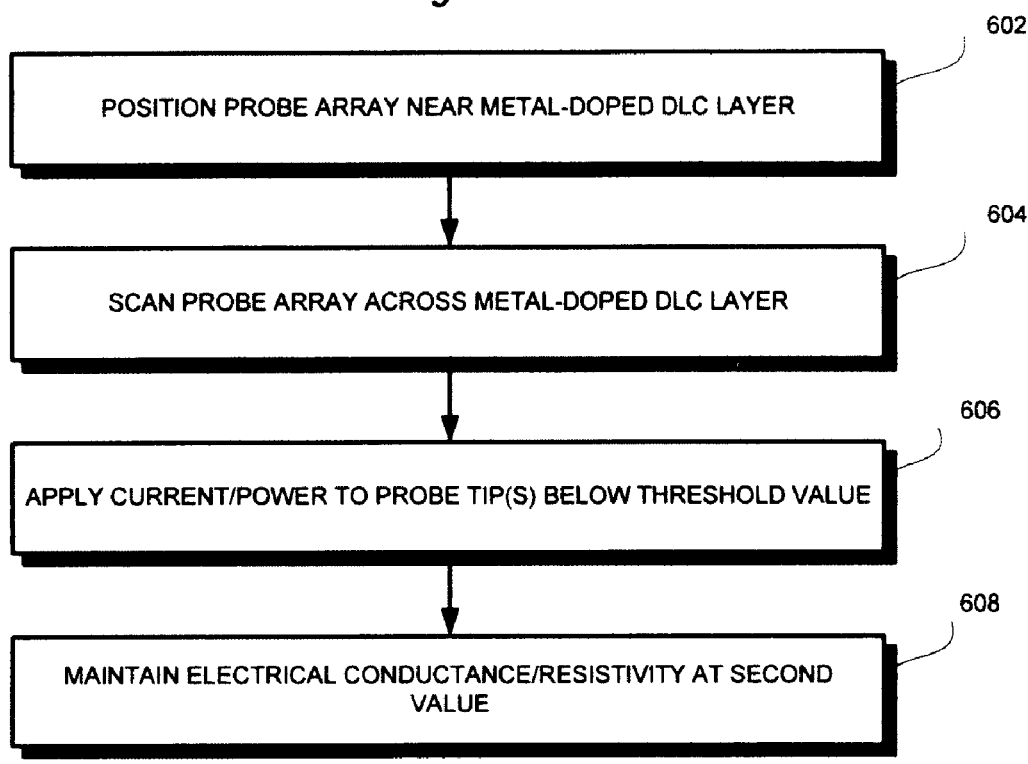
FIG. 6 is a flowchart illustrating a method for reading a data storage medium according to an embodiment of the present invention.
Figure 7:
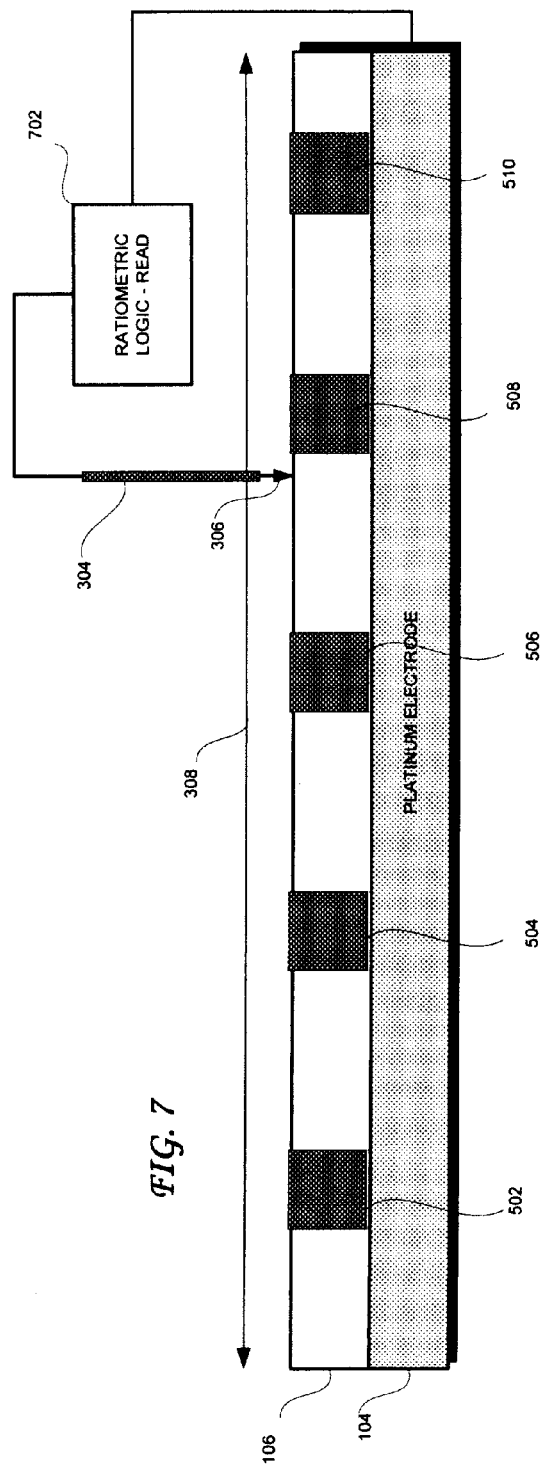
FIG. 7 is a graphic representation illustrating the application of power, current, and/or voltage to a probe to read a data storage medium according to an embodiment of the present invention.
Figure 8:
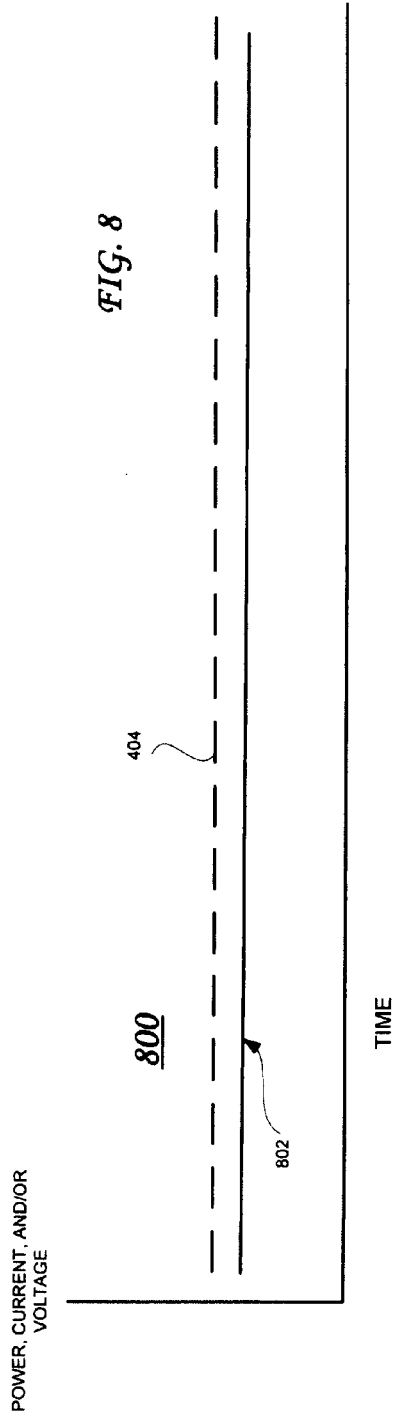
FIG. 8 is a graphic representation illustrating application of power, voltage, and/or current to a probe array to read from a data storage medium according to an embodiment of the present invention.

FIG. 6 is a flowchart illustrating a method 600 for reading at least one data bit from the data storage medium 500 according to an embodiment of the present invention. The method 600 is described with reference to FIG. 7, which illustrates logic 702 that may be used to read from the data storage medium 500 according to an embodiment of the present invention, and FIG. 8, which is a graphic representation illustrating the application of power, voltage, and/or current to a probe array to read from the data storage medium 500 according to an embodiment of the present invention. In the embodiment illustrated in FIG. 8, the graphical representation 800 includes a continuous applied current, voltage, and/or power 802 having a value below the threshold the threshold current, voltage, and/or power value 404.

The logic 702 may be any suitable logic that may provide a current, power, and/or voltage to the probe array 304 and/or the tip array 306 that is below the threshold current, voltage, and/or power value 404 and sense the one or more data bits stored in the data storage medium 100 and/or 500. For some embodiments, the logic 702 may be ratiometric logic capable of sensing a level of conductance, resistivity, and/or resistance of the layer of diamond-like carbon 106 and comparing the sensed level to a predetermined level to determine whether the sensed level will be judged a logical one or a logical zero. The logic 702 may be a proportional-integral-derivative (PID) controller, a comparator, or other suitable ratiometric logic.

Referring to FIG. 6, in block 602 of the method 600, the probe array 304 may be positioned in close proximity or in contact with the layer of diamond-like carbon 106. In block 604, the probe array 304 may be scanned across the surface of the layer of diamond-like carbon 106 in the direction indicated by the arrow 308.

In block 606, a current, voltage, and/or power is applied to the probe array 304 and/or the tip array 306 from the logic 702. The current, voltage, and/or power level applied may be below the threshold current, voltage, and/or power value 404. For some embodiments, a positive voltage may be applied to the tip 306 while holding the platinum electrode layer 104 at ground potential.

In block 608, the electrical conductance, resistance, and/or resistivity of the layer of diamond-like carbon 106 remains at the values obtained after writing to the data storage medium 100. For some embodiments, the conductance, resistance, and/or resistivity of the regions 502, 504, 506, 508, and 510 remain substantially the same as that obtained after writing to those regions. Applying the current, voltage, and/or power value 802 below the threshold current, voltage, and/or power value 404 may be adequate to sense the conductance, resistance, and/or resistivity of the regions 502, 504, 506, 508, and 510 insufficient to change the conductance, resistance, and/or resistivity of the regions 502, 504, 506, 508, and 510. Thus, the current, voltage, and/or power value 802 may be sufficient to read the switched conductance, resistance, and/or resistivity values of the regions 502, 504, 506, 508, and 510.

Figure 9:
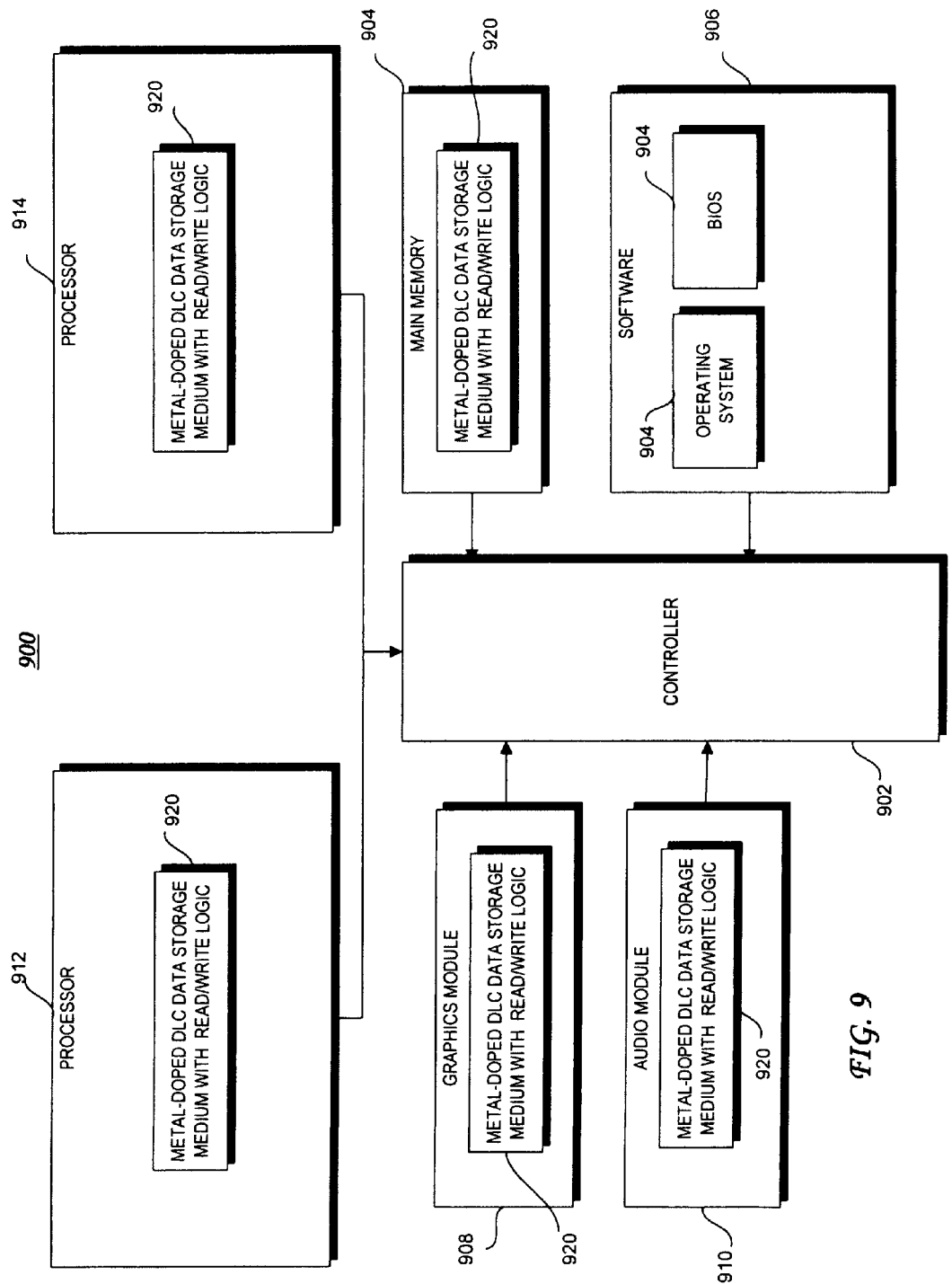
FIG. 9 is a simplified block diagram of a computer system having the according to an embodiment of the present invention.

FIG. 9 is a simplified block diagram of a system 900 according to an embodiment of the present invention. The system 900 may be part of an enterprise server, an MPEG audio layer 3 (MP-3) player, a personal digital assistant (PDA), a disk drive, a telephone, or any other system in which memory may be used.

The system 900 in the illustrated embodiment includes a controller 902. The controller 902 is coupled to main memory 904, software 906, a graphics module 908, an audio module 910, and two processors 912 and 914. The main memory 904, graphics module 908, audio module 910, and two processors 912 and 914 each includes a doped diamond-like carbon data storage medium with read/write logic 920 according to embodiments of the present invention. The software 906 includes an operating system 928 and a basic input/output software (BIOS) 930.

In some embodiments, the controller 902 may manage main memory 904, the graphics module 908, and the audio module 910 and may perform conventional functions of controlling and monitoring the status of memory data lines, error checking, etc. In other embodiments, the controller 902 controls other peripherals.

Main memory 904 in some embodiments performs its conventional functions of storing data (pixels, frames, audio, video, etc.) and software (control logic, instructions, code, computer programs, etc.) for access by other system 900 components.

Software 906, in general, may be control logic, instructions, commands, code, computer programs, etc., executed by the system 900 to perform functions described herein. Software 906 may implement hyper-threading technology.

The operating system 928 may perform its conventional functions of managing the allocation and de-allocation of resources within the system 900 during execution of programs. The operating system 928 may be stored in a read-only memory (ROM) device such as the data storage medium 500.

Figure 10:
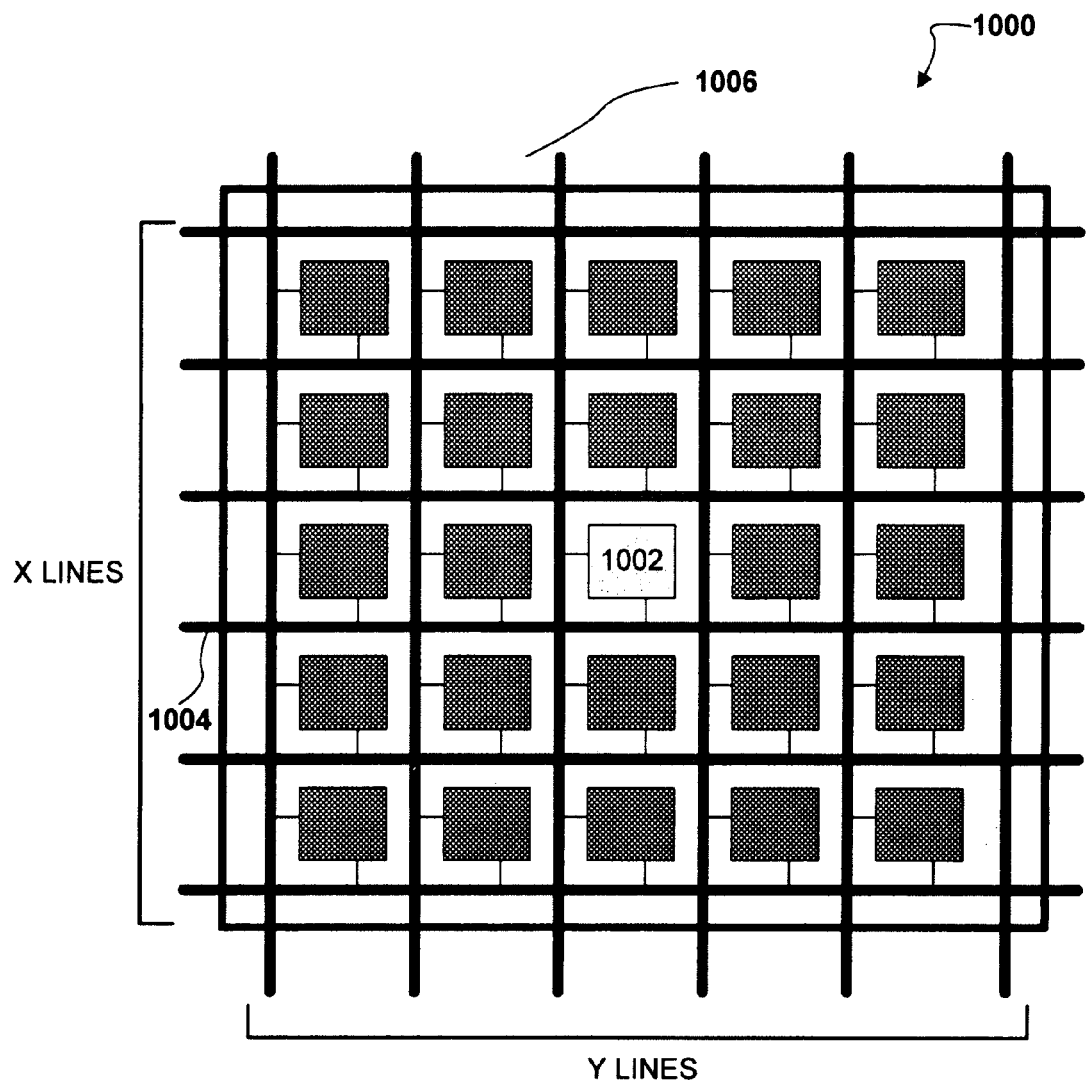
FIG. 10 illustrates a data storage medium according to an alternative embodiment.

FIG. 10 illustrates a data storage medium 1000 according to an alternative embodiment. In the illustrated embodiment, the data storage medium 1000 includes one or more individually addressable memory cells 1002 grouped into an array. Conductive lines 304 and 306 are formed between the memory cells 1002 such that each memory cell 1002 is electrically coupled to two lines and can therefore be individually addressed. In the embodiment shown, the memory cells 1002 are arranged such that each memory cell 1002 in the array is electrically coupled to both an X-line 304 and a Y-line 306. One or both of the X-lines 1004 and Y-lines 1006 are coupled to circuitry (not shown) that allows memory cell 1002 to be individually addressed by activating X-line 1004 and Y-line 1006. In one embodiment, for example, the X-lines 1004 can be coupled to a power source and to control circuitry, while the Y-lines 1006 can be coupled to ground and also to the control circuitry.

Figure 11:
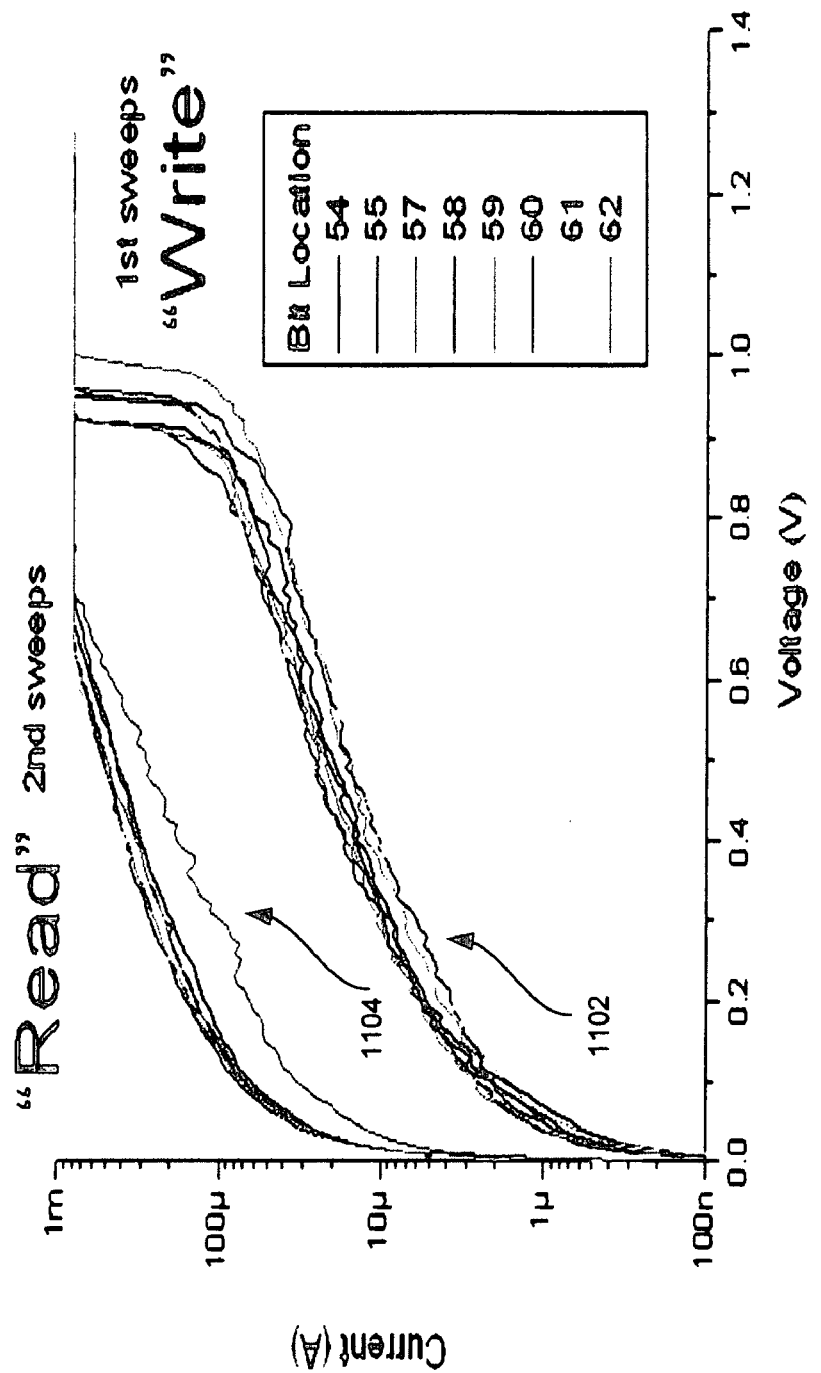
FIG. 11 is a graphical representation of voltage across a doped diamond-like carbon layer being increased linearly and current passing through a doped diamond-like carbon layer according to an embodiment of the present invention.

Recall from above that for some embodiments, if reading or writing to a data storage medium according to embodiments of the present invention that a positive voltage may be applied to the tip 306 of the probe array 304 while holding the platinum electrode layer 104 at ground potential. FIG. 11 is a graphical representation of voltage across the film being increased linearly and current passing through a doped diamond-like carbon layer 106 according to an embodiment of the present invention.

A first set of current-voltage (I-V) curves 1102 illustrate when the tip 306 was used to write to the diamond-like carbon layer 106. The tip 306 was positioned at nine different locations on the diamond-like carbon layer 106 and the current-voltage (I-V) curves 1102 were collected from each of the locations. Note that the current increased nonlinearly until it jumped when the voltage was increased above the threshold voltage. For the illustrated embodiment, current jumps occurred at the threshold voltages ranging from approximately 0.9 to 1V.

A second set of current-voltage (I-V) curves 1104 illustrate when the tip 306 was used to read the diamond-like carbon layer 106. The current-voltage (I-V) curves 1104 illustrate that the conductance of the film exposed to the limiting power increased by approximately 100 times.

FIG. 12 is a conductive atomic force microscope (CAFM) image of an array of high contrast bits 1202 of ones and zeros written to the layer of diamond-like carbon 106 according to an embodiment of the present invention. In the illustrated embodiment, the bits written in the layer of diamond-like carbon 106 may be as small as 30 nm in diameter.

FIG. 13 illustrates a substantially simultaneously imaged topography of the CAFM image of the array of high contrast bits 1202 of ones and zeros written to the layer of diamond-like carbon 106 according to an embodiment of the present invention. Note that in the illustrated embodiment, there are substantially no physical marks on the locations where the bits 1202 were written.

FIG. 14 is a graphical representation illustrating that the bits 1202 remained in the layer of diamond-like carbon 106 according to an embodiment of the present invention. The peaks 1402 correspond to the bits 1202. The peaks 1402 indicate the bits 1202 remained in the layer of diamond-like carbon 106 for at least the duration of 18 hours the layer of diamond-like carbon 106 was tracked.

FIG. 15 is a graphical representation illustrating time evolution of relative amplitude or intensity of bits in terms of initial measured intensity ($I_0$) and subsequent measured intensity (I) over time in hours. In the illustrated embodiment, the bit's amplitude is extracted from line profiles of the bits 1402. The initial measured intensity ($I_0$) may be the nominal value of the bit 1402's amplitude shortly after it was written. In the embodiment illustrated in FIG. 14, an example time is 2:56 p.m. The measured intensity (I) may then be compared with the measured intensity (I) at later times. In the embodiment illustrated in FIG. 14, the measured intensity (I) is then compared with the measured intensity (I) at 3:52 p.m., etc., for the duration of eighteen tracked hours.

The operations of the methods herein have been described as multiple discrete blocks performed in turn in a manner that may be most helpful in understanding embodiments of the invention. However, the order in which they are described should not be construed to imply that these operations are necessarily order dependent or that the operations be performed in the order in which the blocks are presented. Of course, the methods are example methods and other methods may be used to implement embodiments of the present invention.

Embodiments of the present invention may be implemented using hardware, software, or a combination thereof. In implementations using software, the software or machine-readable data may be stored on a machine-accessible medium. The machine-readable data may be used to cause a machine, such as, for example, a processor (not shown) to perform the method 200 and/or 600. A machine-readable medium includes any mechanism that may be adapted to store and/or transmit information in a form accessible by a machine (e.g., a computer, network device, personal digital assistant, manufacturing tool, any device with a set of one or more processors, etc.). For example, a machine-readable medium includes recordable and non-recordable media (e.g., read only (ROM), random access (RAM), magnetic disk storage media, optical storage media, flash devices, etc.), such as electrical, optical, acoustic, or other form of propagated signals (e.g., carrier waves, infrared signals, digital signals, etc.).

In the above description, numerous specific details, such as, for example, particular processes, materials, devices, and so forth, are presented to provide a thorough understanding of embodiments of the invention. One skilled in the relevant art will recognize, however, that the embodiments of the present invention may be practiced without one or more of the specific details, or with other methods, components, etc. In other instances, structures or operations are not shown or described in detail to avoid obscuring the understanding of this description.

Reference throughout this specification to "one embodiment" or "an embodiment" means that a particular feature, structure, process, block, or characteristic described in connection with an embodiment is included in at least one embodiment of the present invention. Thus, the appearance of the phrases "in one embodiment" or "in an embodiment" in various places throughout this specification does not necessarily mean that the phrases all refer to the same embodiment. The particular features, structures, or characteristics may be combined in any suitable manner in one or more embodiments.

The terms used in the following claims should not be construed to limit embodiments of the invention to the specific embodiments disclosed in the specification and the claims. Rather, the scope of embodiments of the invention is to be determined entirely by the following claims, which are to be construed in accordance with established doctrines of claim interpretation.

What is claimed is:

1. An apparatus, comprising:
a layer of conductive material;
a layer of diamond-like carbon disposed on the layer of conductive material, the layer of diamond-like carbon being doped;
a probe array in close proximity with the layer of diamond-like carbon, an individual probe in the probe array having an atomic force microscope tip; and
logic to apply a current, power, and/or voltage to the tip between a threshold current, power, and/or voltage value and a limiting current, power, and/or voltage value if writing a bit to the layer of diamond-like carbon.

2. The apparatus of claim 1, wherein an electrical conductance of at least a portion of the layer of the diamond-like carbon increases from a first conductance value to a second conductance value if the current, power, and/or voltage increases to a value at or above the threshold current, power, and/or voltage value.

3. The apparatus of claim 2, wherein the logic is further to apply the current, power, and/or voltage to the layer of diamond-like carbon at a current, power, and/or voltage value below the threshold current, power, and/or voltage value if not writing a bit to the layer of diamond-like carbon, wherein an electrical conductance of at least a portion of the layer of the diamond-like carbon remains substantially the same if the current, power, and/or voltage is at a value below the threshold current, power, and/or voltage value.

4. The apparatus of claim 1, wherein a phase of at least a portion of the layer of the diamond-like carbon changes from a first cubic orientation to a second cubic orientation if the current, power, and/or voltage increases to a value at or above the threshold current, power, and/or voltage value.

5. The apparatus of claim 4, wherein the phase of at least the portion of the layer of the diamond-like carbon changes from an sp3 cubic orientation to an sp2 cubic orientation if the current, power, and/or voltage increases to a value at or above the threshold current, power, and/or voltage value.

6. The apparatus of claim 1, wherein the diamond-like carbon is doped with at least one of a metal, a metalloid, and/or a non-metal.

7. The apparatus of claim 6, wherein the diamond-like carbon is doped with at least one of molybdenum, tungsten, silicon, nitrogen, and/or boron.

8. The apparatus of claim 1, further comprising a layer of silicon disposed under the layer of conductive material.

9. The apparatus of claim 8, further comprising a layer of material to control inter-diffusion of atoms between the layer of conductive material and the layer of silicon, the layer of material to control inter-diffusion of atoms between the layer of conductive material and the layer of silicon being disposed between the layer of conductive material and the layer of silicon.

10. The apparatus of claim 8, wherein the layer of material to control inter-diffusion of atoms between the layer of conductive material and the layer of silicon comprises at least one of chromium and/or titanium.

11. The apparatus of claim 1, further comprising a lubricant disposed on the layer of diamond-like carbon.

12. The apparatus of claim 1, wherein the logic is further to maintain the current, power, and/or voltage at a value below the threshold current, power, and/or voltage value if reading a bit from the layer of diamond-like carbon.

13. The apparatus of claim 1, wherein the tip includes a layer of platinum disposed thereon.

14. The apparatus of claim 1, wherein the layer of conductive material comprises at least one of platinum, gold, molybdenum, and/or titanium.

15. A method, comprising:
positioning a probe array in close proximity with a layer of doped diamond-like carbon disposed on a layer of conductive layer of metal, an individual probe in the probe array having an atomic force microscope tip;
applying a current, power, and/or voltage to the tip between a threshold current, power, and/or voltage value and a limiting current, power, and/or voltage value if writing a bit to the layer of diamond-like carbon; and
increasing a conductance of at least a portion of the layer of doped diamond-like carbon from a first conductance value to a second conductance value in response to the applied current, power, and/or voltage.

16. The method of claim 15, further comprising scanning the probe array across the layer of doped diamond-like carbon.

17. The method of claim 15, further comprising:
applying the current, power, and/or voltage to the tip below the threshold current value if reading a bit from the layer of doped diamond-like carbon; and
maintaining the conductance of at least a portion of the layer of doped diamond-like carbon at the second conductance value in response to the applied current, power, and/or voltage.

18. The method of claim 17, further comprising scanning the probe array across the layer of doped diamond-like carbon.

19. A system, comprising:
a data storage medium having a layer of conductive material, a layer of diamond-like carbon disposed on the layer of platinum, a layer of diamond-like carbon being doped, a probe array in close proximity with the layer of diamond-like carbon, an individual probe in the probe array having an atomic force microscope tip, and logic to apply a current, power, and/or voltage to the tip between a threshold current, power, and/or voltage value and a limiting current, power, and/or voltage value if writing a bit to the layer of diamond-like carbon; and
a graphics controller coupled to the data storage medium.

20. The system of claim 19, wherein the diamond-like carbon is doped with at least one of a metal, a metalloid, and/or a non-metal.

21. The system of claim 20, wherein an electrical resistivity of at least a portion of the layer of the diamond-like carbon increases from a first electrical resistivity value to a second electrical resistivity value if the current, power, and/or voltage increases to a value at or above the threshold current, power, and/or voltage value.

22. The system of claim 21, wherein an electrical resistivity of at least a portion of the layer of the diamond-like carbon remains substantially the same if the current, power, and/or voltage is at a value below the threshold current, power, and/or voltage value.

23. An article of manufacture, comprising:
a machine-readable medium having data thereon to cause . . .
position a probe array in close proximity with a layer of doped diamond-like carbon disposed on a layer of conductive material, an individual probe in the probe array having an atomic force microscope tip;
apply a current, power, and/or voltage to the tip between a threshold current, power, and/or voltage value and a limiting current, power, and/or voltage value if writing a bit to the layer of diamond-like carbon; and
increase a conductance of at least a portion of the layer of doped diamond-like carbon from a first conductance value to a second conductance value in response to the applied current, power, and/or voltage.

24. The article of manufacture of claim 23, wherein the data is further to cause the machine to scan the probe array across the layer of doped diamond-like carbon.

25. The article of manufacture of claim 23, wherein the data is further to cause the machine to:
apply the current, power, and/or voltage to the tip below the threshold current, power, and/or voltage value if reading a bit from the layer of doped diamond-like carbon; and
maintain the conductance of at least a portion of the layer of doped diamond-like carbon at the second conductance value in response to the applied current, power, and/or voltage.

* * * * *